May 9, 1967  E. LINSKER  3,318,391
MACHINE TOOL
Filed March 15, 1965
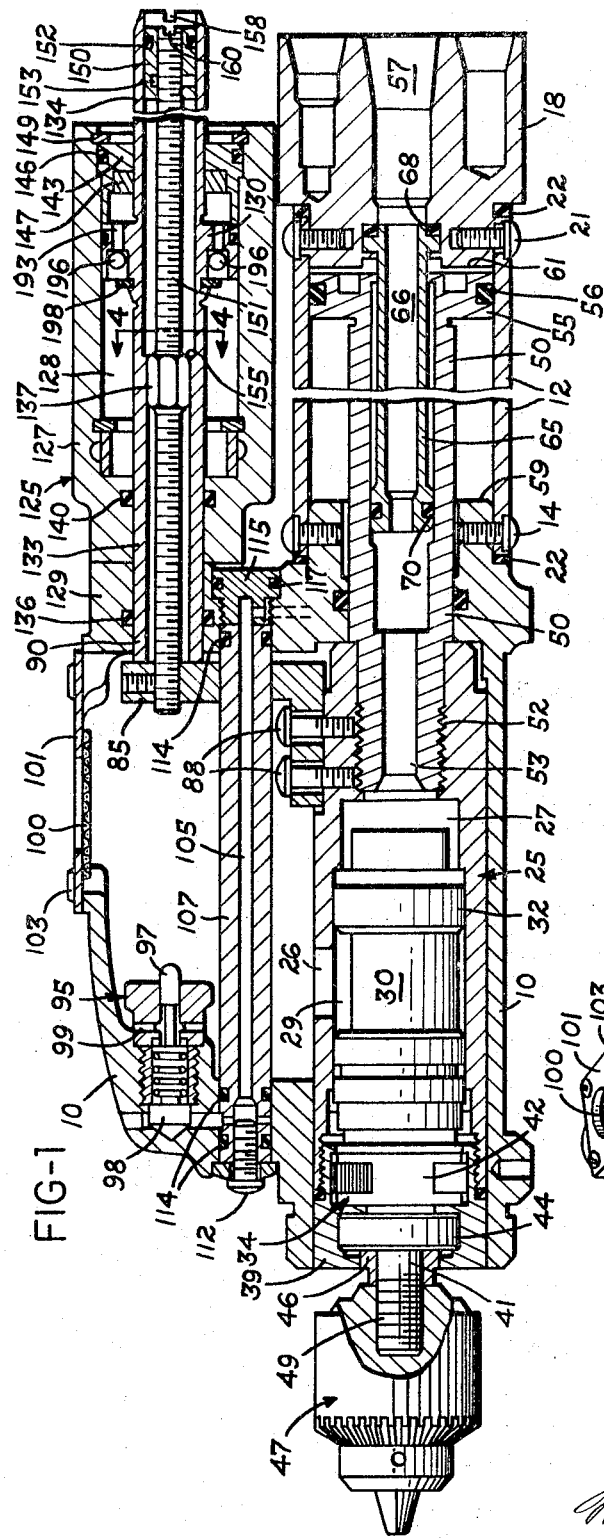
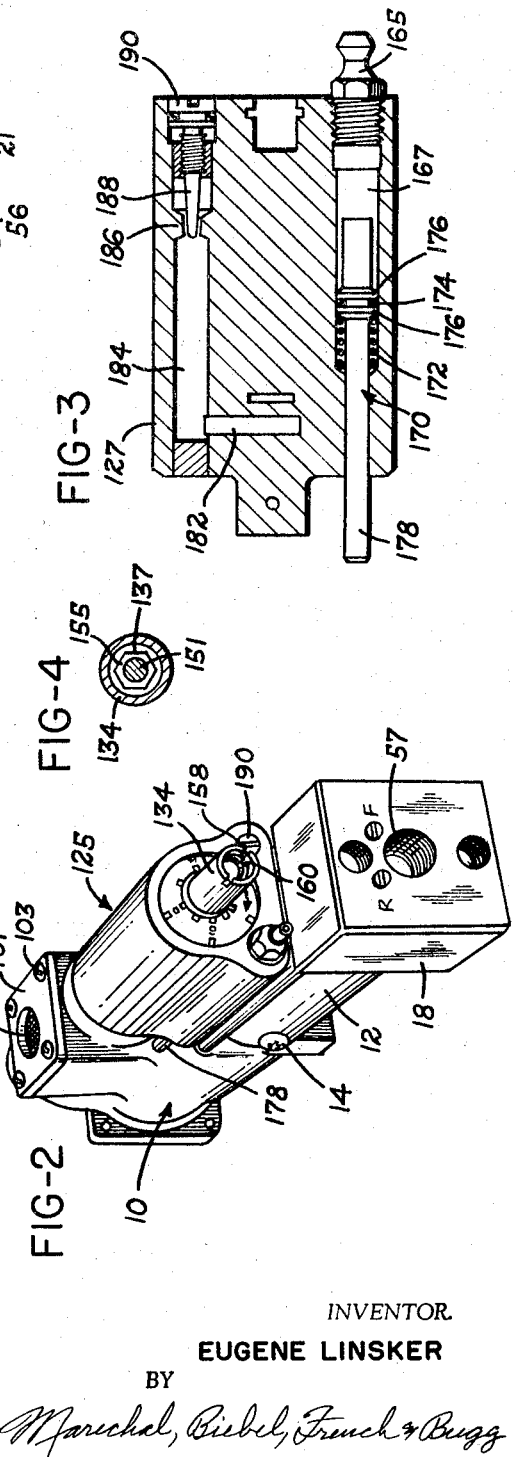
INVENTOR.
EUGENE LINSKER
BY
Marechal, Biebel, French & Bugg
ATTORNEYS

United States Patent Office 3,318,391
Patented May 9, 1967

3,318,391
MACHINE TOOL
Eugene Linsker, Dayton, Ohio, assignor to Rockwell Manufacturing Company, a corporation of Pennsylvania
Filed Mar. 15, 1965, Ser. No. 439,576
10 Claims. (Cl. 173—19)

This invention relates to an improved machine tool, and more particularly, to an improved compact machine tool which automatically feeds and retracts the tool element and includes a hydraulic dashpot device for dampening the rate of feed to prevent damage to the tool element or deforming of the workpiece. The present invention has special relation to an automatic machine tool which includes both a rotary and a linear fluid actuated motor. It is to be understood, however, that while fluid motors are preferred, the machine tool of the invention could be operated with electric motors.

It has been found that frequently it is necessary to arrange a series of machine tools of the type described above in a closely spaced relationship within a given area to perform multiple operations on a small workpiece while it is positioned at one station. For this reason, it has been found that not only is it desirable to construct the machine tool with a narrow width but it is also desirable to hold the overall length of the tool to a minimum. Furthermore, it is frequently desirable to provide as an accessory on such a compact tool the feature of an adjustable dampening device which will prevent the tool element, which is advanced by a positive force, from being damaged or deforming the workpiece. For example, when a drill bit is employed to form a hole through the workpiece, it is often desirable to retard the feed of the drill bit slightly before it completes the hole to avoid a punching effect which may shatter or flare the back surface of the workpiece surrounding the hole. In addition to the above features, when a group of the machine tools are arranged close together it has been found desirable as a result of the limited space to have the adjustment controls for the linear movement of the tool and the controls for the dampening device located at the rear of the tool for convenient access by a simple hand tool, as for example, a screwdriver.

For these reasons, the present invention is directed to an improved machine tool of the type described which provides compactness in length and in width as well as the feature of a dampening device with simplified adjustment controls accessible from the rear. Furthermore, the dampening device is constructed as an accessory to the basic machine tool and can be easily removed when not required, as for example, when bottom holes are drilled within the workpiece. This enables the dampening device to be transferred to other machine tools where the dampening effect is required.

Accordingly, one primary object of the present invention is to provide a novel compact machine tool having a tool head which advances and retracts automatically by a linear action motor and which tool includes a compact dampening device spaced laterally of the linear action motor.

As another object, the machine tool of the present invention provides a compact dampening device which can be easily added and removed as an accessory to the basic compact machine tool without increasing its width or length.

Still another object of the invention is to provide a compact machine tool as described above which includes a dampening device having simplified rear access controls for adjusting the length of stroke and the extent of dampening the feed of the tool head.

A further object of the invention is to provide an easily removable dampening device for a compact machine tool, and which device is dependable in construction and economical to manufacture.

Other objects and advantages of the invention will be apparent from the following description, the accompanying drawing and the appended claims.

In the drawing—
FIG. 1 is an elevational view in axial section of a compact machine tool and dampening device formed in accordance with the invention;
FIG. 2 is a perspective rear view of the machine tool shown in FIG. 1;
FIG. 3 is a plan section view of the dampening device formed in accordance with the invention; and
FIG. 4 is a section view of the piston rod 133 as viewed along the line 4—4 of FIG. 1.

Referring to the drawing which illustrates a preferred embodiment of the present invention, the basic structure of the machine tool includes a housing 10 and a tubular portion 12 extending from one end of the housing and secured thereto by the screws 14. On the rearward end of the tubular portion 12 is mounted a control fitting 18 which is partially recessed within the tubular portion 12 and retained by the machine screws 21. The resilient washers 22 spaced on each end of the tubular portion 12 are provided to form an air tight seal with the control fitting 18 on one end and the housing 10 on the other. Slidably mounted within the housing 10 is a hollow headpiece 25 including an interior having an air supply chamber 27 and a forwardly spaced exhaust chamber 29 of slightly greater diameter which is open to exhaust through a series of radially spaced openings 26.

A rotary air motor 30, for example of a well-known sliding vane type, is mounted within the headpiece 25, and includes a land 32 which separates the supply and exhaust chambers from each other, as shown. This motor may include a suitable planetary reduction gearing shown generally at 34, which is secured in place by a retainer 39 threaded into the forward end of the headpiece 25. The output of the gear set is through a spindle 41 which is formed integrally with the cage 42, and journaled within a forward bearing 44 which is supported within the retainer 39. A seal ring 46 surrounds the forward end of the spindle 41, and secures the inner race of bearing 44.

A conventional chuck 47 is mounted on the spindle 41 by the threads 49. This chuck may carry a rotary cutting tool, such as a drill, reamer, countersink or the like, and the entire unit, including the headpiece 25 is adapted to move linearly within the housing 10 while the motor 30 rotates the cutting tool. It is to be understood, of course, that the chuck 47 may be replaced by some other form of tool holder, as for example, a tapping head, collet or multiple spindle head which may be attached to the spindle by means other than threaded, such as a tapered socket connection.

The linear movement of the headpiece 25 and enclosed air motor 30 is derived from a linear action pneumatic motor which includes a hollow piston rod 50 extending rearwardly of the headpiece 25, and preferably removably attached by the threaded portion 52. The piston rod includes an internal passage 53 which connects with the chamber 27 to supply air for the rotary motor. A piston 55, preferably carrying a surrounding O-ring 56, or equivalent sealing member, is formed as an integral part of the hollow piston rod 50. Of course, the piston 55 could be formed separately and joined to the piston rod 50.

As the linear action motor is preferably constructed to be a double-acting type, a control valve system is mounted within the fitting 18 and an air passageway (not shown) is provided to connect the main air supply opening 57 with an opening in the end face 59 of the housing 10 to provide for retraction of the piston 55. Another passageway serves to connect the opening 57 through the control valve system to an opening in the forward face 61 of fitting 18 to provide for feeding of the piston 55. These passageways and the control valve system are shown and described in detail in applicant's copending application S.N. 385,262, filed July 27, 1964, and assigned to the same assignee as this application.

Mounted on the forward end of the control fitting 18 is a hollow tube 65 which contains a passageway 66 connecting on the rear end with the main air supply opening 57 and on the forward end with the internal passageway 53 within the piston rod 50. The hollow tube 65 is sealed air tight to the control fitting 18 by an O-ring 68. Another O-ring 70 is located near the opposite end of the hollow tube 65 and serves to provide an air tight seal between the hollow tube and inside surface of the hollow piston rod 50 which slides back and forth over the tube.

Mounted for reciprocating movement with the headpiece 25 is a lever 85 which extends radially outwardly and is secured to the headpiece 25 by the machine screws 88. Threaded through the end portion of the lever 85 is an adjustable stop member or screw 90 which is carried by the lever 85.

Mounted in the forward end of the housing 10, and spaced laterally of the rotary motor 30, is a normally closed valve 95 which includes a spring biased valve stem 97 which is depressed by the stop screw 90 as the headpiece 25 reaches its extended or advanced position. When the valve stem 97 is depressed, air pressure within the chamber 98 is allowed to escape through the openings 99 into the internal portion of the housing 10 and out through the screened opening 100 in the cover plate 101 which is fastened to the housing by the screws 103. The opening 100 also serves to exhaust the air flowing through the opening 26 from the rotary motor 30.

Pressurized air is supplied to the pilot valve 95 through a passageway 105 within a hollow tube 107 which is mounted within the housing 10 on an axis parallel to the axis of the headpiece 25 and hollow piston rod 50. At the rearward end of the hollow tube 107, the passageway 105 is connected by a passageway (not shown) to the main control fitting so that a release of the air pressure in passageway 105 serves to actuate control valves (not shown) within the fitting 18 to retract the piston 55. It is to be understood, however, that the control valve system within the fitting 18 forms no part of the present invention. An opening is provided within the lever 85 in order for the lever to slide over the hollow tube 107 which enables the tube 107 to serve an antitorque rod for the headpiece 25 as it extends and retracts. The forward end of the hollow tube 107 is provided with an air tight seal by the screw 112, and O-rings 114. The opposite end of the tube is sealed by the plug 115 and O-rings 114 and 117. A hydraulic dashpot or dampening device 125 is mounted for easy mounting and removal on the housing 10 and is spaced laterally of the linear action motor and includes a housing 127 which defines a cylindrical internal chamber 128. The housing 127 is rigidly secured to the main housing 10 by the screws (not shown) which are spaced on opposite sides of the lever 85 and extend through suitable holes within the portion 129 of the housing 10 and are threaded into the forward portion or face of the housing 127.

Slidably mounted within the chamber 128 is a piston 130 which has a forwardly extending tubular piston rod 133 and rearwardly extending piston rod 134. The forward rod 133 extends through the forward portion of the housing 127 and is slidably retained within the housing 10. A suitable resilient O-ring 136 provides an air tight seal with the housing 10. The elongated opening formed within the forward tubular piston rod 133 is hexagonal in cross-sectional configuration (FIG. 4) to receive the hexagonal shaped head 137 of the stop screw 90 to prevent relative turning therebtween while enabling the stop screw 90 to move axially within the forward piston rod 133. The forward portion of the housing 127 is provided with a resilient O-ring 140 which engages the cylindrical external surface of the forward piston rod 133 to form a fluid tight seal therewith.

Inserted within the rear portion of the housing 127 is an annular plug 143 which is sealed to the housing 127 by an O-ring 146 and is secured therein by the retaining ring 149. The rear piston rod 134 is formed with a cylindrical internal surface which is adapted to receive slidably the cylindrical adjusting nut 150 threadably mounted on the screw portion 151 which extends rearwardly from the end of the stop screw 90. An O-ring 152 is mounted on the nut 150 to form an air tight seal with the rear piston rod 134 and a plastic plug 153 is mounted within the nut 150 to prevent the nut 150 from vibrating from its preset position. When the screw portion 151 is carried forwardly with the stop screw 90, the adjusting nut 150 is adapted to engage the shoulder 155 (FIG. 4) defined by the change from the circular configuration to the hexagonal configuration within the forward tubular piston rod 133.

The rear end of the piston rod 134 is provided with a slot 158 and another slot 160 is provided in the nut 150. Thus, it can be seen that by rotating the piston rod 134 with a suitable screwdriver or the like, the stop screw 90 is adjusted within the lever 85 which, in turn, adjusts the length of stroke of the linear action motor by changing the distance between the end of the stop screw 90 and the plunger 97 of the control valve 95. Furthermore, since the adjusting nut 150 is threadedly mounted on the rear threaded portion 151 of the stop screw 90, by rotating the nut 150 with a suitable spanner wrench, the distance between the shoulder 155 and the forward face of the nut 150 is adjusted which determines when the stop screw 90 will pick up the piston rod.

The chamber 128 is completely filled with a suitable hydraulic fluid through the fitting 165 (FIG. 3) which is also accessible from the rear. The fluid enters the chamber 128 through the reservoir chamber 167 by a passageway (not shown) connected between the two chambers. Slidably mounted within the reservoir chamber 167 is a plunger 170 which is biased rearwardly towards the fitting 165 by a compression spring 172. An O-ring 174 is spaced between the two collars 176 to prevent leakage of the fluid along the plunger 170. The forward end 178 of the plunger 170 extends forward of the housing 127 and serves as an indicator for the supply of fluid within the reservoir chamber 167. Thus, when the end of the plunger 170 approaches the forward face of the housing 127, it is an indication that additional fluid should be added.

The piston 130 cooperates with the housing 127 to define a variable volume chamber on each end of the piston, and it is the purpose of the piston 130 to transfer hydraulic fluid from one of these variable chambers to the other as the piston is carried forwardly by engagement of the nut 150 and the shoulder 155 within the piston rod 133. To accomplish this transfer, a passageway 182 (FIG. 3) is provided within the housing 127 and serves to connect the forward part of the chamber 128 to a longitudinal passageway 184 formed in the lower portion of the housing 127. Restricting the passageway 184 is a neck 186 which cooperates with the tapered portion 188 of a feed rate control screw 190 to form an adjustable restriction or throttle valve within the pasageway 184.

The rear end of the chamber 184 is connected by a passageway (not shown) to the rear end of the chamber 128. In this manner, as the piston 130 moves forwardly after the piston rod 134 is picked up by the nut 150, the fluid within the chamber on the forward end of the piston 130 is transferred through the throttle valve within the passageway 184 to the chamber on the rear end of the piston 130. By adjusting the feed rate control screw 190 which is accessible from the rear, the rate of transfer of the fluid can be conveniently adjusted.

To prevent retarding of the movement of the rotary motor 30 as it is retracted into the housing 10, the hydraulic fluid within the chamber 128 is permitted to transfer freely through the piston 130 by means of the shoulder passageways 193 (FIG. 1) and the one way valves provided by the balls 196 spaced within the passageways 193 and retained therein by the retaining ring 198.

From the drawings and the above description, it can be seen that the machine tool according to the present invention provides a number of advantages and features. For example, the machine tool provides compactness not only in width but in length. This enables a group of similar machine tools to be arranged within a limited space for providing multiple machining operations on a small part or workpiece. Furthermore, the dampening device is adapted to be easily attached and removed as an accessory without increasing the overall dimensions of the machine tool. In addition, it can be seen that as a result of the construction of the dampening device, all of the adjustable controls are accessible from the rear of the machine tool which enables a group of like machine tools to be spaced close together not only in a side-to-side relationship but also in a closely stacked relationship.

The length of feed of the linear action motor can easily be adjusted by inserting an appropriate tool within the slot 158 and rotating the piston rod 134 either clockwise or counterclockwise depending on whether the stroke is to be lengthened or shortened. Furthermore, by adjusting the nut 150 with a screwdriver inserted within the slot 160, the point at which the dampening device becomes effective can be adjustably set. In addition, rear access is provided to the feed rate control screw 190 which determines the degree of dampening. When the dampening device is not required, however, it may be easily removed and replaced by a stop screw having a slotted head and enclosed within a guide tube which is mounted within the housing 10 in place of the forward piston rod 133, as shown in the aforementioned application.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An improved compact power tool comprising a housing, a rotary motor slidably mounted within said housing for movement in an axial direction, a linear action motor mounted within said housing, means for connecting said linear action motor to said rotary motor to provide for advancement and retraction of said rotary motor in relation to said housing, control means mounted within the forward portion of said housing, a device for controlling the length of stroke and dampening the rate of advancement of said linear action motor, means for mounting said device on said housing in a laterally spaced relationship to said linear action motor, a piston slidably mounted within said device for transferring fluid contained therein and having tubular piston rod means extending therefrom, an adjustable stop member slidably mounted within said rod means and adapted to engage said control means, dampening control means adjustably connected to said stop member and adapted to connect with said rod means to provide for concurrent movement of said stop member and said rod means, and means connecting said stop member to said linear action motor for advancing said stop member with said rotary motor until said stop member engages said control means which is adapted to reverse said linear action motor for retracting said rotary motor and said stop member.

2. An improved compact power tool as defined in claim 1 wherein said stop member and said dampening control means are adapted for convenient adjustment from the rear of the tool.

3. An improved compact power tool comprising a first housing, a rotary fluid motor slidably mounted within said first housing for movement in an axial direction, a linear action fluid motor connected to said first housing and positioned on an axis colinear with the axis of said rotary motor, means for connecting said linear action motor to said rotary motor to provide for advancement and retraction of said rotary motor in relation to said first housing, control valve means mounted within said first housing, a device for controlling the length of stroke and dampening the rate of advancement of said linear action motor and including a second housing, means for removably mounting said second housing on said first housing, a piston slidably and rotatably mounted within said second housing for transferring fluid contained therein and having tubular piston rod means extending therefrom, an adjustable stop screw slidably mounted within said rod means and adapted to be rotated by the turning of said piston rod means, adjusting means slidably retained within said piston rod means and threadably connected to said stop screw, means on said rod means for connecting with said adjusting means to provide for concurrent movement of said stop screw and said rod means, and means connecting said stop screw to said linear action motor for advancing said stop screw with said rotary motor until said stop screw member engages said control valve means which reverses said linear action motor for retraction of said rotary motor and said stop screw.

4. An improved compact power tool comprising a housing, a rotary motor slidably mounted within said housing for movement in an axial direction, a linear action motor connected to said housing and positioned on an axis colinear with the axis of said rotary motor, means for connecting said linear action motor to said rotary motor to provide for advancement and retraction of said rotary motor in relation to said housing, control valve means mounted within said housing and spaced laterally of said rotary motor when said motor is retracted within said housing, a device for controlling the length of stroke and dampening the rate of advancement of said linear action motor, means for mounting said device on said housing in a laterally spaced relationship from said linear action motor, a piston slidably mounted within said device for transferring fluid contained therein and having tubular piston rod means extending therefrom, an adjustable stop member slidably mounted within said rod means and aligned for engaging said control means, means adjustably connected to said stop member and adapted to engage said rod means to provide for concurrent movement of said stop member and said rod means, and means connecting said stop member to said linear action motor for advancing said stop member with said rotary motor until said stop member engages said control means which reverses said linear action motor for retraction of said rotary motor and said stop member.

5. An improved compact power tool comprising a first housing, a rotary fluid motor slidably mounted within said housing for movement in an axial direction, a linear action fluid motor connected to said housing and positioned on an axis colinear with the axis of said rotary motor, means for connecting said linear action motor to said rotary motor to provide for advancement and retraction of said rotary motor in relation to said housing, control valve means mounted on the forward portion of said housing, a device for controlling the length of stroke and dampening the rate of advancement of said linear action motor and including a second housing, means for removably mounting said second housing on said first housing, a piston slidably mounted within said second housing for transferring fluid contained therein and having tubular piston rod means extending from both ends of said piston through a second housing, an adjustable stop screw slidably mounted within said rod means and adapted to be rotated thereby, nut means adjustably connected to said stop screw and adapted to engage said rod means to provide for concurrent movement of said stop screw and said rod means, and lever means connecting said stop screw to said linear action motor for advancing said stop screw with said rotary motor until said stop screw engages said control valve means which reverses said linear action motor for retraction of said rotary motor and said stop screw.

6. An improved device for controlling the length of stroke and dampening the rate of advancement of the head of a power operated machine tool such as a power fed drill, said device comprising a housing defining a cylindrical chamber, a piston slidably mounted in said chamber, a tubular piston rod extending from both ends of said piston, means sealing said piston rod to said housing to provide a fluid tight variable volume chamber on each end of said piston, a passageway connecting said variable volume chambers and an adjustable restricting valve in said passageway for controlling the flow of fluid through said passageway in one direction from one of said chambers to the other, one way valve means for providing substantially free flow of fluid between said chambers in a reverse direction, a stop member slidably mounted within said piston rod and adapted to connect through one end of said piston rod to said tool for linear movement with the tool head, adjusting means connected to said stop member and slidably retained within said tubular piston rod and accessible for adjustment from the end of said piston rod opposite the connection of said stop member, and means on said piston rod for stopping the relative sliding movement of said adjusting means within said piston rod so that said piston is carried with said stop member for dampening the rate of advancement of the tool head.

7. An improved device for controlling the length of stroke and dampening the rate of advancement of the head of a fluid operated machine tool having a control valve operable to retract the tool head, said device comprising a housing defining a cylindrical chamber, a piston slidably and rotatably mounted in said chamber, a tubular piston rod extending from both ends of said piston, means sealing said piston rod to said housing to provide a fluid tight variable volume chamber on each end of said piston, a passageway connecting said variable volume chambers and an adjustable restricting valve in said passageway for controlling the flow of fluid through said passageway in one direction from one of said chambers to the other, one way valve means for providing substantially free flow of fluid between said chambers in a reverse direction, a stop screw slidably mounted within said tubular piston rod and adapted to connect adjustably through one end of said rod to the tool head for linear movement with the tool head and further adapted to actuate the control valve, means for providing rotation of said stop screw in response to rotation of said piston rod, an adjusting means threadably connected to said stop screw and slidably retained within said tubular piston rod and accessible for adjustment from the end of said piston rod opposite the connection of said stop screw, and means on said piston rod for stopping the relative sliding movement of said adjusting means within said piston rod so that said piston is carried with said stop screw for dampening the rate of advancement of the tool head.

8. An improved device as defined in claim 6 wherein said restricting valve, said stop screw and said adjusting screw are all adapted for convenient adjustment from the same end of said device.

9. An improved device for controlling the length of stroke and dampening the rate of advancement of the head of a power operated machine tool such as a power fed drill, said device comprising a housing defining a cylindrical chamber, a piston slidably mounted in said chamber, tubular piston rod means extending from both ends of said piston, means sealing said piston rod means to said housing to provide a fluid tight variable volume chamber on each end of said piston and to provide for rotation of said piston rod means within said housing, a passageway connecting said variable volume chambers and an adjustable restricting valve in said passageway for controlling the flow of fluid through said passageway in one direction from one of said chambers to the other, one way valve means for providing substantially free flow of fluid between said chambers in a reverse direction, a threaded stop member slidably mounted in said piston rod means and adapted to connect by threaded engagement through one end of said piston rod means to said tool for linear movement with the head, means for providing rotary movement of said stop member with the rotation of said piston rod means, adjusting means threadably connected to said stop member and slidably contained within said tubular piston rod means and accessible for adjustment from the end of said piston rod means opposite the connection of said stop member, said opposite end of said piston rod means being accessible for turning to adjust the engagement of said stop member, and shoulder means on said piston rod means for stopping the relative sliding movement of said adjusting means within said piston rod means so that said piston is carried with said stop member for dampening the rate of advancement of the tool head.

10. An improved device for controlling the length of stroke and dampening the rate of advancement of the head of a fluid operated machine tool having a control valve operable to cause retraction of the tool head, said device comprising a housing adapted to be removably mounted on said tool and defining a cylindrical chamber, a piston slidably mounted in said chamber, a tubular piston rod extending from each end of said piston, means sealing said piston rod to said housing to provide a fluid tight variable volume chamber on each end of said piston and to provide for rotation of said piston rod within said housing, a passageway connecting said variable volume chambers and an adjustable throttle valve in said passageway for controlling the flow of fluid through said passageway in one direction from one of said chambers to the other, one way valve means for providing substantially free flow of fluid between said chambers in a reverse direction, a threaded stop screw slidably mounted in said piston rod and adapted to connect by threaded engagement through the forward end of said piston rod to said tool for linear movement with the tool head, socket means for providing rotation of said stop screw in response to the rotation of said piston rod means to vary the distance between the end of said stop screw and the control valve, an adjusting nut threaded onto the rear portion of said stop member and slidably contained within said piston rod and accessible for adjustment from the rear end of said piston rod, said rear end of said piston rod having means engageable for turning said rod to adjust the engagement of said stop screw, and shoulder means within said piston rod for stopping the relative sliding movement of said adjusting nut within said piston rod so that said piston is carried with said stop screw for dampening the rate of advancement of the tool head.

References Cited by the Examiner
UNITED STATES PATENTS

| | | | |
|---|---|---|---|
| 2,657,595 | 11/1953 | Shaff | 77—33.5 |
| 2,857,789 | 10/1958 | Robinson | 173—13 |
| 2,860,531 | 11/1958 | Groff | 173—159 |
| 3,141,509 | 7/1964 | Bent | 173—19 |
| 3,266,580 | 8/1966 | Clapp et al. | 173—19 |

FRED C. MATTERN, Jr., *Primary Examiner.*

L. P. KESSLER, *Assistant Examiner.*